US005778072A

United States Patent [19]
Samar

[11] Patent Number: 5,778,072
[45] Date of Patent: Jul. 7, 1998

[54] SYSTEM AND METHOD TO TRANSPARENTLY INTEGRATE PRIVATE KEY OPERATIONS FROM A SMART CARD WITH HOST-BASED ENCRYPTION SERVICES

[75] Inventor: Vipin Samar, Cupertino, Calif.

[73] Assignee: Sun Microsystems, Inc., Mountain View, Calif.

[21] Appl. No.: 499,485

[22] Filed: Jul. 7, 1995

[51] Int. Cl.$^6$ .................................................. H04K 1/00
[52] U.S. Cl. .............................. 380/30; 380/21; 380/25
[58] Field of Search ............................ 380/21, 23, 24, 380/25, 49, 30, 28, 29, 3, 4

[56] References Cited

U.S. PATENT DOCUMENTS

| | | | |
|---|---|---|---|
| 4,944,007 | 7/1990 | Austin | 380/21 |
| 5,124,117 | 6/1992 | Tatebayashi et al. | 380/21 |
| 5,142,578 | 8/1992 | Matyas et al. | 380/21 |
| 5,191,611 | 3/1993 | Lang | 380/25 |
| 5,265,164 | 11/1993 | Matyas et al. | 380/21 |
| 5,282,249 | 1/1994 | Cohen et al. | 380/21 |
| 5,299,263 | 3/1994 | Beller et al. | 380/21 |
| 5,307,411 | 4/1994 | Anvret et al. | 380/21 |
| 5,402,492 | 3/1995 | Goodman et al. | 380/25 |
| 5,406,628 | 4/1995 | Beller et al. | 380/30 |
| 5,432,852 | 7/1995 | Leighton et al. | 380/21 |
| 5,541,994 | 7/1996 | Tomko et al. | 380/30 |
| 5,581,615 | 12/1996 | Stern | 380/21 |
| 5,588,061 | 12/1996 | Ganesan et al. | 380/21 |
| 5,602,915 | 2/1997 | Campana et al. | 380/21 |

OTHER PUBLICATIONS

Ferreira, R.C., "The Smart Card: A High Security Tool in EDP", Philips Telecommunication and Data Systems Review, vol. 47, No. 3, Sep., 1989, Hilversum, Netherlands.

Muftic, S. and Sloman, M., "Security Architecture for Distributed Systems", Computer Communications, vol. 17, No. 7, Jul., 1994, Jordan Hill, Oxford, Great Britain.

*Primary Examiner*—David C. Cain
*Attorney, Agent, or Firm*—Fenwick & West LLP

[57] ABSTRACT

A system and method provide transparent integration of a smart card private key operations with an existing set of encryption services and system applications. A key store manager manages user key data, and handles requests for key operations from the system applications. A user information file stores user data, including user private keys for users that do not have smart cards, and an indication of those users that have smart cards. A set of system applications interfaces with the key store manager through encryption protocol specific application programming interfaces. Users connect to the system through terminals or remote computers that may be equipped with smart card readers. For users having smart cards, the key store manager forwards to the smart cards requests for private key operations, such as encryption or decryption with the user's private key, from the system applications. In this manner the user's private key cannot be compromised by exposure to the computer system. For users without smart cards the key store manager forwards the request for private key operation to an encryption service for handling. The key store manager may handle only requests for private key operations, with the system applications identifying and handling directly public key operations, or the key store manager may handle both private key and public key operations.

18 Claims, 3 Drawing Sheets

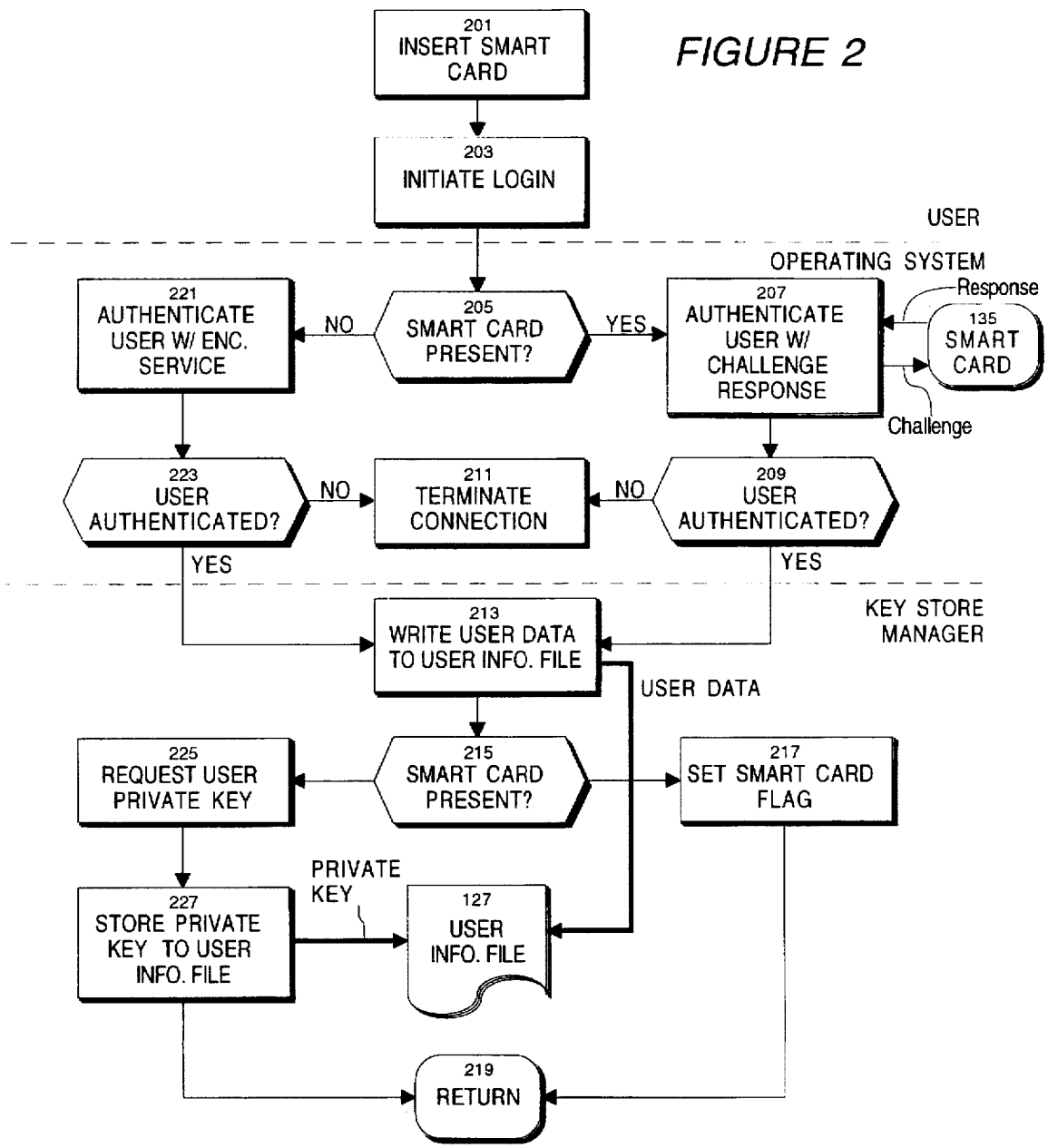

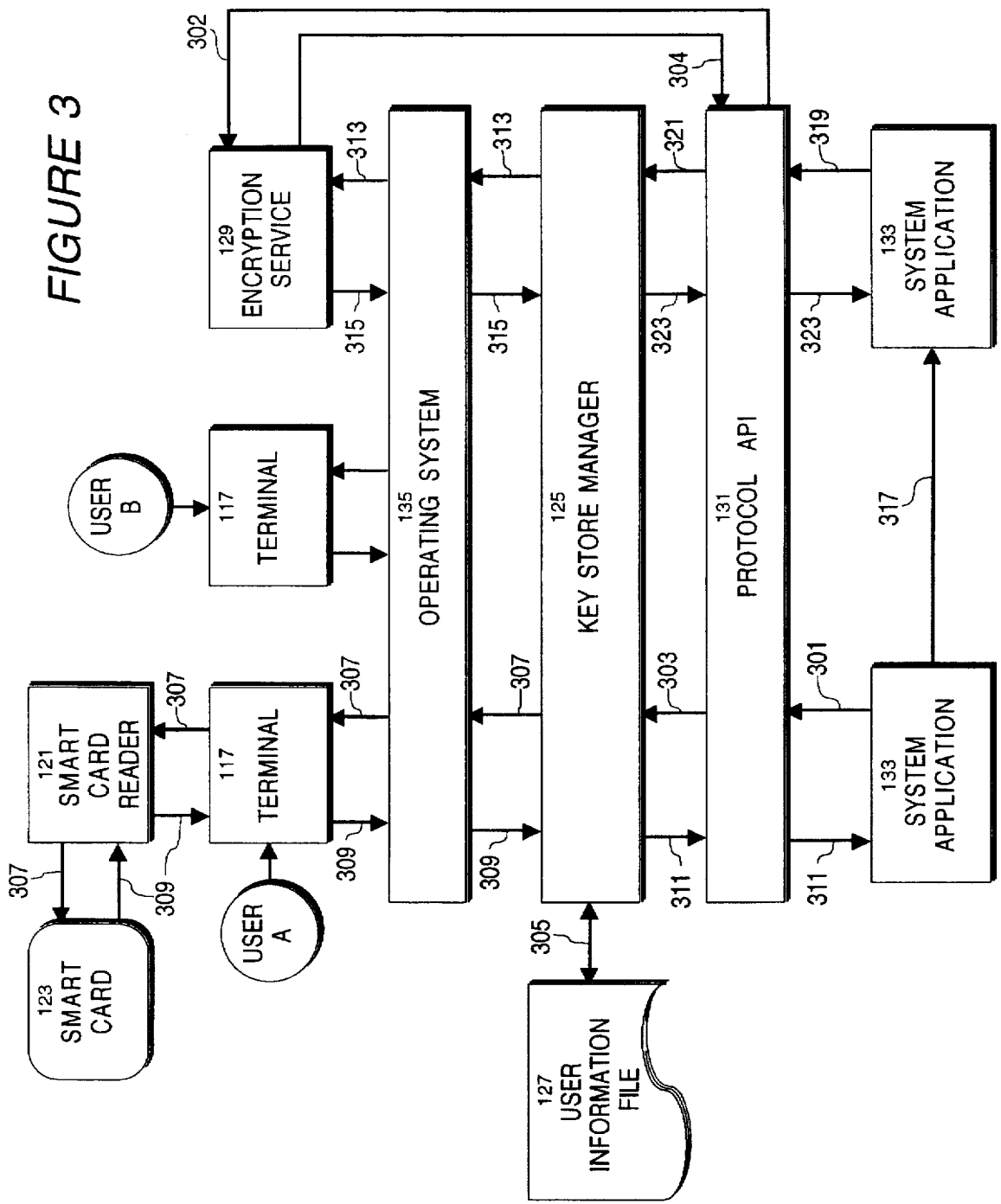

SYSTEM AND METHOD TO TRANSPARENTLY INTEGRATE PRIVATE KEY OPERATIONS FROM A SMART CARD WITH HOST-BASED ENCRYPTION SERVICES

BACKGROUND

1. Field of the Invention

The invention relates generally to methods and systems for managing user access to networked computers, and more particularly, to methods and systems that support the use of public key encryption for secure communication between users.

2. Background of the Invention

Many computer systems, particularly networked computer systems supporting many users, generally employ some form of security system to provide secure communications between users of the system. These systems generally employ some type of authentication scheme, typically either secret key, such as Kerberos, or public key, such as Diffie-Hellman, RSA, or the like.

In a public key system, there is provided for each user a public key and a private key. The public key is publicly distributed to anyone, including all users of the computer system. The public key can be used by recipients to encrypt a communication to the owner of the public key, or can be used to authenticate a communication from the owner that has been encrypted by the owner's private key. Similarly, the owner can use the private key to decrypt communications from others that have been encrypted with the public key.

While the public key is freely distributed, the private key is held in a secure facility, such as a smart card, or stored in encrypted form in a public facility. The mode of storage depends on the security and ease of use requirements of the system and the user.

In most embodiments, the encrypted private keys are stored in a naming service, file, or other user available storage facility. In this type of system, all the key operations, such as encryption or decryption, are performed by a key store manager that manages authentication and encryption for users of the computer system. Since most computer systems support multiple different authentication and encryption schemes, either the key store manager tracks for each user the particular schemes the user employs, or there are separate key store managers for each scheme. The key store manager is typically either a daemon, which is a process that executes a particular behavior on behalf of a user, or is a software library that runs as part of a system application.

When the user is initially authenticated on the computer system through an encryption service, the user's credentials are typically obtained from a directory, naming service, or the encryption service itself and stored with the key store manager. The credentials generally include the user's name, user identifier and group identifier, and the user's private key. The credentials are then stored in the computer system by the key store manager for future use by the other applications executed by the user. This allows the other applications to employ the user's credentials by accessing the key store manager, without requiring the user to be authenticated each time the credentials are obtained. An application that needs to access the credentials sends a request to the key store manager, which then processes the request, for example, encrypting a document, and returns the result to the calling application. In order to have access to the key store manager, the applications use application programming interfaces that are specific to the underlying encryption schemes.

Generally, the key store manager used to manage the user credentials is shared by all users of the computer system in order to minimize resources and increase performance. As a result, the key store manager must enforce a strict ownership policy of the private keys, so that no user can obtain or use the private key of any other user.

In this type of embodiment, the user credentials, including the private key, are stored in the computer system because the credentials are managed by a local key store manager, and held in a memory, file or other on-line facility. If the security of the computer system or the key store manager is compromised, the private keys of all the users become accessible to the intruder. This problem may occur on computer systems that allow access through publicly available workstations or other channels.

One solution to the foregoing problem is to store the private key of each user on a personally held smart card. In this embodiment, the private key never leaves the smart card, and the data to be encrypted or decrypted is sent to the smart card directly. Thus, storing the private key in a smart card is advantageous because the private key is safely maintained therein, never passing through the computer system. Even if the computer system is compromised, the user's private key is not available to the intruder.

In both a smart card based approach and a host encryption based approach there must be provided encryption scheme specific application programming interfaces to the system applications that allow such applications to obtain private key and user data from the appropriate resource, whether it is the key store manager, or the smart card.

Smart card based authentication and encryption is a relatively recent development, and not found on many computer systems, many of which employ the key store manager described above. However, an increasing number of enterprises are becoming security conscious, and seek the increased security performance of smart card authentication and encryption. Converting over to a smart card installation typically means eliminating the key store manager, and rewriting the system applications to directly invoke the smart card, supplanting the existing API calls with an entirely different set of interfaces. Because different smart cards may employ differing encryption schemes, the applications would typically have to be rewritten to allow them to determine and employ the appropriate interface. However, many of these firms would prefer to preserve the current investment in their computer system, and avoid the cost of rewriting the system applications to accommodate the smart cards.

Accordingly, it is desirable to provide a mechanism that allows smart card authentication and encryption to operate transparently with an existing key store manager, so that both smart cards and conventional key store manager based authentication and encryption are available.

SUMMARY OF THE INVENTION

The present invention overcomes the foregoing various limitations by providing a means of integrating the key store manager with a plurality of smart cards. A computer system incorporates both the key store manager and any number of smart cards by providing a path between the key store manager and any of the smart cards available on the computer system. The key store manager includes a set of interfaces to the smart cards that allow it to facilitate communication between the system applications and the smart cards for handling private key based operations. The key store manager further maintains a database that describes for each user their user information and the encryption scheme they are using, including whether the scheme is provided by the host computer system itself or by an attached smart card.

The computer system operates as follows. As the user is connecting to the computer system using conventional system entry services, the operating system of the computer determines whether the user is employing a smart card for authentication, or is relying on a host-based encryption service. Where the user is employing a smart card, the operating system authenticates the user via the smart card, for example, using a challenge-response protocol to authenticate the user. Once the user is authenticated, the key store manager stores in its internal database data indicating that this particular user has a smart card, and the particular encryption schemes of the smart card. The smart card is connected to the computer system via the appropriate smart card reader or similar input device.

At some point the user may need a key operation to encrypt or decrypt some item of information being accessed by one of the available system applications. The application determines whether the key operation requires a private key or a public key, depending on the encryption protocol in use. Where a private key operation is need, the application issues a request to the key store manager for the appropriate private key operation, using the existing encryption scheme specific APIs already provided in the system applications. When the key store manager receives such a request from a system application, it checks its internal database and determines whether the user was authenticated by a smart card. If the user is using a smart card, then the key store manager forwards the application's private key operation request to the smart card via the correct scheme specific interface. The smart card performs the requested operation and returns the result to the key store manager. The key store manager forwards the result to the calling application. If the user was not using a smart card, then the key store manager obtains the private key data from a memory or other storage facility, and passes the private key data along with the requested private key operation to the appropriate encryption service. Alternatively, the encryption service may obtain the private key data from an available storage facility.

If the user at some point removes the smart card from the smart card reader, the operating system interprets this act as logging out of the computer system and terminating the user's session. The operating system updates the key store manager of this action, which in turn updates its internal database to remove the user.

This smart card integration mechanism allows an existing application base on a host computer to be used transparently with either smart cards or the host authentication/encryption services, because each of the system applications does not have to be rewritten with the specific interfaces used by the smart cards. Thus, the system reduces the difficulty and cost of integrating a smart card system, allowing enterprises to incrementally increase the security of their computer systems using smart card technology, while preserving their current investment in software and user training.

In addition, the ability to have both smart card and host-based authentication and encryption increases the flexibility of the computer's security system. For example, it allows smart cards to be used only by selected individuals with high security needs, such as the system administrator, executive-level users, finance or purchasing managers, or the like, while providing lower performance host-based security to other users, such as data entry workers. As a related benefit, the system administrator can determine how the private keys of any of the users are stored, and is no longer constrained to use only one type of encryption/authentication system.

BRIEF DESCRIPTION OF THE DRAWINGS

FIG. 2 is a flowchart of the process of connecting to the computer system and authenticating a user.

FIG. 3 is a dataflow diagram illustrating the process of handling private key operations through the key store manager.

DETAILED DESCRIPTION OF THE INVENTION

System Architecture

Figure 1:
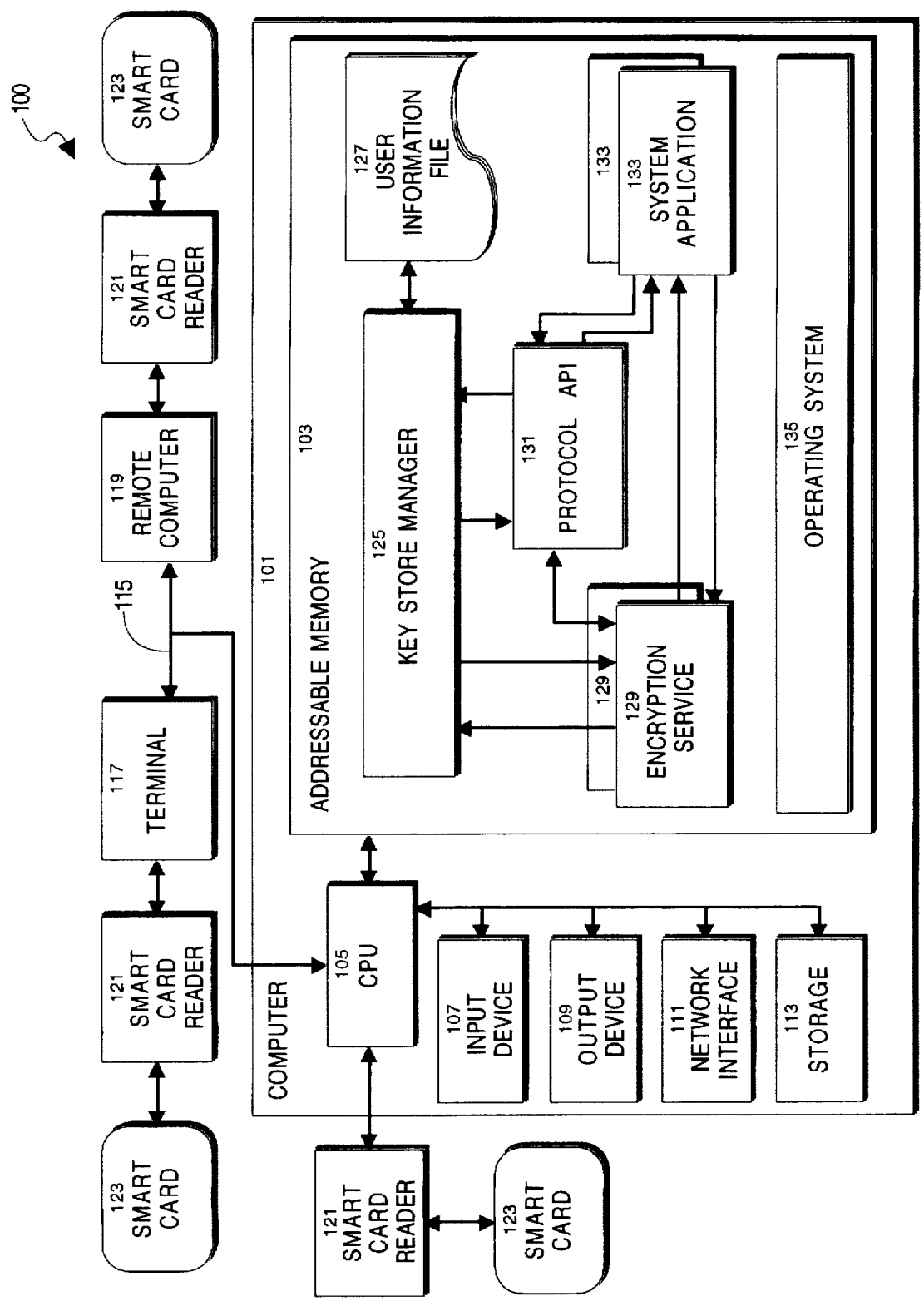
FIG. 1 is a block diagram of a computer system providing integrated smart card and host-based encryption.

Referring now to FIG. 1, there is shown one embodiment of a computer system providing integrated smart card and host-based authentication and encryption. The system 100 includes a computer 101, having an addressable memory 103, a processor 105, input 107 and output 109 devices, a network interface 111, and a mass storage device 113.

The computer 101 may be realized by most general purposes computers, such as a SPARCstation™ computer manufactured by Sun Microsystems, Inc. of Mountain View, Calif. Any other general purpose computer may also be adapted for use with the invention. Computer 101 executes a general purpose operating system 135, such as Sun Microsystems' Solaris® operating system, resident in the addressable memory 103. The operating system 135 and various elements provided in the addressable memory 103 are executed by the processor 105 in a conventional manner. The processor 105 also reads and writes data and code files to and from the mass storage device 113.

Users may connect to the computer system 100 over a network 115, such a LAN, WAN, or the like, from either a remote computer 119, or a terminal 117, or other similar device via network interface 111. Coupled to each terminal 117 or selected remote computer 119 is a smart card reader 121. The smart card reader 121 receives a smart card 123 in a conventional manner. Each smart card 123 is unique to its owner-user, and contains the user's private keys (as used in both private and public key system) and any public keys. The smart card 123 further includes microprocessor technology that embeds selected encryption schemes, such as RSA, Diffie-Hellman, DES, DSS, and the like, in a ROM device coupled to a microprocessor. The smart card 123 is thereby capable of encryption and decryption operations in accordance with its firmware programming. The smart card 123 further stores at least one private key for the user, and may also store passwords or personal information numbers used to encrypt the private keys. The smart card 123 may also connect to the computer 101 directly, through a smart card reader 121 coupled to the processor 105, through a conventional peripheral interface.

The addressable memory 103 further includes a key store manager 125, a user information file 127, a set of encryption services 129, a set of encryption protocol specific application programming interfaces 131, and set of system applications 133.

The operations of the key store manager 125 include processing requests to create private or public key data with one of the encryption services 129; writing such key data to the user information file 127, or similar storage facility, obtaining existing private key data from either a smart card 123 or the user information file 127 or similar storage facility, and processing encryption/decryption requests. These particular operations are further described below.

The encryption services 129 provide conventional key operations, including encryption and decryption, on ciphertext and plaintext as requested, and operations to create public/private keys or encryption keys, as appropriate to the encryption scheme. An encryption service 129 may provide either public key, private key, challenge-response, or any other type of authentication and encryption protocol. An encryption service 129 may be passed in a key and a request for a key operation, or if a key is not provided, the encryption service 129 may obtain the necessary key from some storage facility that maintains the keys, such as the user information file 127.

The system applications 133 are applications available to authenticated users of the computer system 100, and provide conventional operations, such as databases, word processing, electronic mail, and the like. A user of a system application 133 may require that particular data be securely communicated to another user, for example, a confidential personnel file, email message, or the like, and so may need to encrypt such data with either the user's private key, the recipient's public key, and so forth, as per any desired security protocol. Likewise, a user of a system application 133 may need to receive and decrypt information that has been encrypted. In such instances, the system application 133 can request the appropriate operation or operations of the encryption services 129 by invoking the appropriate protocol specific API 131, and passing the necessary data, including public keys, and the ciphertext or cleartext through the API to the key store manager 125. Alternatively, the system application 133 may directly invoke an encryption service 129, or it may access the encryption service 129 through the API 131. In the preferred embodiment the system applications 133 determine whether a given key operation necessitates a private key or a public key, based on the encryption protocol being used, and pass only requests for private key operations to the key store manager 125. In another embodiment the system applications 133 passes all key operations through the key store manager 125, indicating the type of key operation, the key store manager 125 then obtains the requested public key or private key operation.

The user information file 127 is a database managed by the key store manager 125. The user information file 127 identifies each currently connected user of the computer system 100, including for example, the user id, group id, user name, remote host or terminal id, connection port, and the like. The user information file 127 also contains for each user a smart card flag indicating whether the user is using a smart card 123 for encryption operations. Where the user does not have a smart card 123, and is authenticated by an encryption service 129, the user information file 127 also stores the user's unencrypted private key(s)or may contain a pathname to s some storage facility that contains the private key. The private key is obtained by the key store manager 125 from either the user information file 127, or other facility that stores the private and public keys of authorized users of the system 100.

System Operation

Initial System Connection

Referring now to FIG. 2, there is shown a transaction flow diagram of the operation of the computer system 100 during connection of a user to the system 100. In this scenario, the user has a smart card 123. The user inserts 201 the smart card 123 into a smart card reader 121 attached to the user's computer. The user initiates 203 a session on the computer 101 by invoking a conventional system entry service such as login. The operating system 135 determines 205 whether the user has a smart card 123 present, which is the case in this example. The operating system 135 then authenticates 207 the user. This is preferably done by initiating a challenge/response protocol, or a particular password/personal identification number protocol with the user's smart card 135. In the preferred embodiment, the operating system 135 determines the particular protocol employed by the user's smart card 123, and provides the appropriate challenge vector to it, receives the result from the smart card 135, and authenticates the result with one of the available encryption services 119. The smart card 123 will return a value to the operating system 135 indicating whether the authentication was successful. Other authentication protocols may also be used.

The operating system 135 determines 209 whether the user was authenticated according to a result received from the smart card 123. If the user was authenticated, access to the system 100 is granted. Otherwise, the operating system 135 terminates 211 the connection with the user.

Once the user is authenticated, the operating system 135 informs the key store manager 125 of the user's particular user data, such as the user id, group id, and the like. The key store manager 125 writes 213 the user data to the user information file 127. The key store manager 125 determines 215 whether the smart card 135 is present, and if so, sets 217 a smart card flag in the user data in the user information file 127, and returns 219. At this point the key store manager 125 is ready to handle requests for private key operations from the various system applications 133 and interface those requests to the smart card 123 of the user.

Where the user does not have a smart card 123, then the operating system 135 authenticates 221 the user with any of the selected encryption services 129. Again, if the user is authenticated 223, then access is granted, otherwise the connection is terminated 211. Since no smart card 123 is presented, the key store manager 125 requests 225 from a selected encryption service 129 a private key for the user, along with a session key, Kerberos ticket, and or like, as appropriate to the selected security protocol of the system 100. This private key, and the like, is then written 227 to the user information file 127. The key store manager returns 219 control to the application, indicating whether the authentication of the user was successful or not.

From the foregoing it can be seen that where the user has a smart card 123 the user's private key is never exposed to the system 100, and thus cannot be compromised, even if the system 100 is compromised during or after the authentication process.

Key Operations

Referring now to FIG. 3, there is shown a dataflow diagram of the process for handling key operations with the key store manager 125, with respect to both smart card 123 based encryption and host-based encryption. In this diagram user A has previously connected to the computer 101, and been authenticated via the smart card 123, and the user information file 127 reflects that user A has a smart card 135. User B, on the other, hand connected with a terminal 117 without using a smart card 123, and was authenticated using one or more of the encryption services 129.

Assume that user A, in the course of using a first system application 133, needs a key operation, for example, to encrypt an email message to user B, thereby requiring use of user B's public key. Assume further that user B needs authentication of the message to ensure that it was sent by user A. This requires encryption with user A's private key. Such an exchange is a typical scenario for public key systems. The first system application 133 that user A is running provides a suitable command operation that user A invokes for this purpose, for example, addressing the message to user B, and selecting encryption and signature.

In the preferred embodiment, the first system application 113 determines that the first key operation is a private key encryption operation on user A's private key in order to authenticate, or sign, the message. The system application 133 invokes 301 the protocol specific API 131 to a particular encryption scheme, passing to the API data (such as a message digest, or the like) to be encrypted, along with user data indicating the user A is making the request. The first system application 133 does not have to know that user A has a smart card 123.

The protocol API 131 passes 303 the data, the function request, and the user A data to the key store manager 125. The key store manager 125 reads 305 from the user information file to determine whether user A has a smart card 123. User A does have a smart card 123 in this example, and so the key store manager 125 passes 307 the function request and data, whether the message, or the message digest, to the smart card 123 via the smart card reader 121, with the appropriate operating system 135 interface.

The smart card 135 encrypts the data, using user A's private key which is non-readably stored therein, meaning that other devices external to the smart card 123 can read or obtain the private key. This first encryption operation is used to authenticate the message as originating with user A, since only user A's public key can be used to decrypt the data, for example, the message digest. The smart card returns 309 the encrypted data to the key store manager 125. Because the private key operation is performed entirely within the smart card 123, user A's private key is never exposed to the computer 101, and never resides in the addressable memory 103, the storage device 113, or any other publically available facility. Thus, even if the system 100 had been previously compromised, or is subsequently compromised, user A's private key would still be secure.

The key store manager 125 forwards 311 the encrypted data, to the first system application 133. The first system application 133 determines that the second key operation is an encryption operation with user B's public key. The first system application 133 invokes 301 the appropriate API 131 for the next encryption step of encrypting with user B's public key, to pass 302 the encryption request directly to the encryption service 129. Alternatively, there may be provided a hardcoded connection from the system applications 133 to the encryption service 129. Since the encryption service 129 does not have user B's public key, it may access it from the user information file 127 or other storage facility. The encryption service 129 performs the public key encryption operation on the message, or the message-encryption key, and returns 304 it to the system application 133. The first system application 133 forwards 317 this message to user B.

Now user B receives the encrypted email message, and desires to decrypt and read it. User B invokes an appropriate system application 133 (which may be different from the one used by user A) to access the encrypted message. This second system application 133 determines that the message, or message-encryption key, must be first decrypted with user B's private key. Accordingly, the second system application 133 invokes 319 the protocol specific API 131 to obtain the first decryption step.

The protocol API 131 forwards 321 the encrypted data, along with the user B data to the key store manager 125. The key store manager 125 again reads 305 the user information file 127 to determine whether user B has a smart card 123. This not being the case, the key store manager 125 obtains user B's private key from the user information file 127, or other facility, and forwards 313 user B's key and the encrypted message 300 to the appropriate encryption service 129, according to the API call. Again, if the system 100 has been compromised, only user B's private key can be stolen, which, as a policy decision may be acceptable if user B is not a high security individual, as would likely be the case.

The encryption service 129 decrypts the encrypted message with user B's private key, and returns 315 the result to the key store manager 125. The key store manager 125 forwards 323 the result to the second system application 133. The second system application 133 determines that the message, or the message digest, is encrypted with user A's private key however, and so the second system application 133 invokes 319 the protocol API 131 in order to decrypt the message, or message digest with user A's public key. Through the protocol API 131 the second system application 133 invokes 302 an appropriate encryption service 129 to handle the request. Alternatively, where the smart card 123 provides a higher performance key operation, there may be provided a means for the second system application 133 to pass the public key operation to the smart card 123 for decrypting with user A's public key. In the former case, the encryption service 129 obtains user A's public key from the user information file 127, and decrypts the message, thereby authenticating it from user A. Alternatively, the public key may be obtained from user A's smart card 123. The authenticated message is then passed 304 back to the second system application 133. At this point, user B has authenticated the message as coming from user A, and can read it.

In a second embodiment, the system applications 133 still makes the determination of whether a key operation is private or public, but passes 301 requests for both types key operations to the key store manager 125 with parameter data indicating the type of key operation. The key store manager 125 receives each request for a key operation, and according to passed in parameters indicating that a private key operation is needed, the key store manager 125 reads 305 the user information file 127 to determine for a given private key operation whether the user has a smart card 123 or not. Where the user has a smart card, the key store manager 125 forwards 307 the key operation request to the smart card 123, as above. The smart card 123 processes the private key request as above, passing 309 it back to the key store manager 125.

Likewise, for public key operations, the key store manager 125 reads 305 the user information file 127, obtains user B's public key, and forwards 313 this data to the appropriate encryption service 129. The encryption service 129 encrypts the message or digest with user B's public key. The encryption service 129 returns 315 the result back to the key store manager 125, which passes it to the calling system application 133.

These illustrative scenarios can reversed, with user B initiating the communication, with the same results. The main aspect here is that the key store manager 125 dynamically determines whether a given user has a smart card 123 or not, and directs to either the smart card 123 or the appropriate encryption service 129 the necessary data for the private key operations. As a result, neither the encryption services 129, protocol APIs 131, or the system applications 133 need to be modified to provide the transparent behavior between these components.

These above described interactions can continue, with respect to user A, until user A logs out of the computer 101, or removes the smart card 123. In the latter case, the operating system 135 detects the removal of the smart card 123 from the card reader 121 and since at this point user A can no longer be authenticated, or provide any private key operation, the operating system 135 terminates user A's session, logging user A out of the computer 101. The key store manager 125 is so informed by the operating system 135, and removes user A data from the user information file 127.

In the above example, both user A and user B are on the same computer 101. This however need not be the case, and they can be connected through different computers 101 through the network 115. In this case, the operating system 135 and key store manager 125 on each computer 101 perform the respective operations for the user of that machine.

I claim:

1. A computer system integrating at least one encryption service that provides at least one key operation with a smart card providing at least one key operation, comprising:
  at least one smart card that provides at least one key operation for a private key of a user, and that non-readably stores the private key of the user; and,
  a computer including:
    at least one computer executable application program capable of requesting a key operation; and,
    a key store manager that communicatively couples to the application program and receives therefrom a request for a key operation for a first user, the key store manager determining whether the first user has a first smart card, and responsive to the first user having first smart card, the key store manager communicatively coupling to the first smart card and providing thereto the request for a key operation on a first private key of the first user, the first smart card providing a key operation on the first private key; and responsive to the first user not having the first smart card, the key store manager communicatively coupling to a first encryption service, the first encryption service providing a key operation on the first private key.

2. The computer system of claim 1, further comprising:
  a computer readable storage facility that stores user data for selected users, the user data identifying the user and whether the user has a smart card;
  wherein the key store manager communicatively couples to and determines from the storage facility whether the first user has a first smart card.

3. The computer system of claim 1, wherein each application program determines whether a key operation is a private key operation or a public key operation, and provides to the key store manager only private key operations.

4. The computer system of claim 1, wherein each application program requests the key store manager both private key operations and public key operations.

5. The computer system of claim 1, wherein responsive to the first user not having the first smart card, the key store manager obtains the first private key and provides it to the first encryption service.

6. The computer system of claim 1, wherein responsive to the first user not having the first smart card, the first encryption service obtains the first private key.

7. In a computer system having at least one smart card providing at least one key operation for a private key of a user, and non-readably storing the private key of a user, a computer readable storage facility that stores user data for selected users, the user data indicating whether a user has been authenticated to the computer system by a smart card, at least one computer executable encryption service providing at least one key operation, and at least one computer executable application program capable of requesting a key operation, a computer readable medium including a computer executable program controlling the operation of the computer to provide smart card and host-based encryption, and comprising:
  a key store manager capable of communicatively coupling to the application program and receiving therefrom a request for a key operation for a first user, the key store manager capable of communicatively coupling to and determining from the storage facility whether the first user has a first smart card, and responsive to the first user having a first smart card, the key store manager capable of communicatively coupling to the first smart card and providing thereto a request for a key operation on a first private key of the first user; and responsive to the first user not having the first smart card, the key store manager capable of communicatively coupling to a first encryption service, the first encryption service providing a key operation on the first private key.

8. The computer readable medium of claim 7, further comprising:
  a computer readable storage facility that stores user data for selected users, the user data identifying the user and whether the user has a smart card; and,
  wherein the key store manager is capable of communicatively couples to and determining from the storage facility whether the first user has a first smart card.

9. The computer system of claim 7, wherein each application program determines whether a key operation is a private key operation or a public key operation, and provides to the key store manager only private key operations.

10. The computer system of claim 7, wherein each application program provides to the key store manager both private key operations and public key operations.

11. The computer system of claim 7, wherein responsive to the first user not having the first smart card, the first encryption service obtains the first private key.

12. In a computer system having at least one encryption service providing at least one key operation, a computer implemented method of providing a user smart card capable of providing at least one private key operation on a user private key stored thereon, comprising the steps of:
  receiving a request from an application program for a private key operation on the private key of the user;
  determining whether the user has a smart card;
  responsive to the user having a smart card, transmitting the request to the smart card, the smart card providing the private key operation; and,
  responsive to the user not having a smart card, performing the step of:
    transmitting the request to the encryption service, the encryption service providing the private key operation.

13. The method of claim 12, further comprising the step of:
  storing in a computer readable medium user data identifying the user and indicating whether a user has a smart card; and, wherein the step of determining whether the user has a smart card further comprises reading from the computer readable medium the user data.

14. The method of claim 12, further comprising the steps of:

connecting the user to the computer system;

determining whether the user has a smart card;

responsive to the user having a smart card, performing the steps of:

coupling the smart card to the computer system; and, storing in the computer readable medium data indicating that the user has a smart card.

15. The method of claim 14, further comprising the steps of:

responsive to the user not having a smart card, performing the step of:

storing in a computer readable medium facility data identifying the user and a private key of the user.

16. The method of claim 14, further comprising the steps of:

determining whether the smart card is uncoupled from the computer system; and responsive to the smart card being uncoupled from the computer system, disconnecting the user from the computer system.

17. The method of claim 15, further comprising the step of:

obtaining a private key of the user from a storage facility.

18. The method of claim 12, further comprising the step of:

returning to the application program a result of the private key operation.

* * * * *